US012469921B1

United States Patent
Chu et al.

(10) Patent No.: US 12,469,921 B1
(45) Date of Patent: Nov. 11, 2025

(54) QUICK-RELEASE TAIL CAP SWITCH STRUCTURE

(71) Applicant: Shenzhen Sandao Laser Technology Co., Ltd., Shenzhen (CN)

(72) Inventors: Jiayang Chu, Shenzhen (CN); Zhen Tian, Fengcheng (CN)

(73) Assignee: Shenzhen Sandao Laser Technology Co., Ltd., Shenzhen (CN)

( * ) Notice: Subject to any disclaimer, the term of this patent is extended or adjusted under 35 U.S.C. 154(b) by 0 days.

(21) Appl. No.: 19/026,589

(22) Filed: Jan. 17, 2025

(30) Foreign Application Priority Data

Jan. 14, 2025 (CN) .......................... 202510061153.5

(51) Int. Cl.
*H01M 50/271* (2021.01)
*H01M 50/24* (2021.01)
*H01M 50/247* (2021.01)
*H01M 50/284* (2021.01)

(52) U.S. Cl.
CPC ......... *H01M 50/271* (2021.01); *H01M 50/24* (2021.01); *H01M 50/247* (2021.01); *H01M 50/284* (2021.01)

(58) Field of Classification Search
CPC ... H01M 50/271; H01M 50/247; F21K 9/235; F21K 9/237
See application file for complete search history.

(56) References Cited

U.S. PATENT DOCUMENTS

2013/0122748 A1 * 5/2013 Rapisarda ................ A43B 3/36
439/629

FOREIGN PATENT DOCUMENTS

KR 100945299 B1 * 3/2010

* cited by examiner

*Primary Examiner* — Maria Laios
*Assistant Examiner* — Jordan E Berresford
(74) *Attorney, Agent, or Firm* — Hemisphere Law, PLLC; Zhigang Ma (57) ABSTRACT

The present utility model relates to the field of tactical light sights and discloses a quick-release tail cap switch structure, including a tail cap switch main body, a hanging hook, a locking clasp assembly, and a connecting shaft. The tail cap switch main body is fixed to a tactical light sight by the rotatable connecting shaft. During snapping, the hanging hook engages with the locking clasp assembly to achieve stable fixation. When a battery needs to be replaced, the locking clasp assembly can be pushed and unlocked to quickly open a tail cap switch. The present utility model has significant advantages in structure, is compact and firm as a whole, and can withstand external force impact and vibration. The waterproof performance is excellent. Special sealing treatment can effectively prevent water intrusion. The design takes into account various tactical environments and usage habits.

7 Claims, 4 Drawing Sheets

QUICK-RELEASE TAIL CAP SWITCH STRUCTURE

FIELD OF TECHNOLOGY

The present utility model relates to the field of tactical light sights, specifically to a quick-release tail cap switch structure.

BACKGROUND

During actual use of tactical light sights, it is often necessary to replace batteries. The conventional tail cap switch structure may have problems of cumbersome operation, insecure fixation, and poor waterproof performance. For example, some tail cap switches require tools during dismounting and mounting, which is time-consuming and makes it impossible to quickly replace the batteries in emergency situations. Some tail cap switches are fixed in an unreliable manner and are prone to loosening when subjected to vibration or external force impact, affecting the normal use of the tactical light sights. Besides, the waterproof design of some tail cap switches is imperfect, and they are prone to water ingress in complex environments, which will damage internal circuits. Therefore, it is of great practical significance to develop a tail cap switch structure that is compact and firm, has excellent waterproof performance, and is convenient for quickly replacing a battery.

SUMMARY

An objective of the present utility model is to provide a quick-release tail cap switch structure, to solve the problems such as inconvenience in battery replacement, loose fixation, and poor waterproof performance of an existing tail cap switch of a tactical light sight, and meet the usage requirements in various tactical environments.

To achieve the above objective, the present utility model provides the following technical solution:

A quick-release tail cap switch structure includes a tail cap switch assembly, a hanging hook, a locking clasp assembly, and a connecting shaft.

The tail cap switch assembly includes a tail cap main body, side buttons, switch guide posts, compression springs, button pin rods, a sealing rubber gasket, and an electrode switch assembly.

The side buttons are fixed to two sides of the tail cap main body by the button pin rods, the side buttons are rotatable about the button pin rods as shafts, the side buttons are provided with protrusions a, and the protrusions a are configured to drive the switch guide posts to touch surface-mounted switches on electrode switches. The compression springs are disposed inside the side buttons and are configured to provide an elastic force to restore the side buttons after the side buttons are pressed.

Protrusions b are disposed on two sides of the tail cap main body and are configured to prevent the side buttons from being accidentally touched.

The side buttons are fixed to the tail cap main body by the pin rods. Such a connection way not only ensures the stability of the side buttons but also enables them to rotate flexibly. When the side buttons are pressed, they rotate about the pin rods as the shafts, and the protrusions on the side buttons precisely drive the switch guide posts to press the surface-mounted switches in the electrode switch assembly, so as to achieve control on turn-on and turn-off of a tactical light sight. The compression springs are disposed inside the side buttons and are configured to provide the elastic force after the side buttons are pressed so as to assist in quickly restoring the side buttons for the next operation. To prevent the side buttons from being accidentally touched during use of the tactical light sight, the protrusions are specially designed on the two sides of the tail cap main body. In such a physical blocking way, the possibility of misoperation is reduced.

The electrode switch assembly includes an electrode PCB, electrode springs, electrode caps, an electrode plate holder, an electrode plate cover, a switch signal contact, long fixing screws, and a switch fixing plate. The electrode caps, the electrode plate holder, and the electrode plate cover together form an electrode protection structure. The switch fixing plate and the electrode PCB are disposed in the electrode protection structure. The electrode springs are disposed between the electrode PCB and the electrode caps, and provide an elastic contact force to ensure good electrical connection between electrodes and a battery. The electrode PCB is configured to implement circuit conduction and signal processing. The switch signal contact is disposed on the electrode plate holder and is configured to transmit an operation signal in cooperation with a contact pin of the tactical light sight.

The electrode caps, the electrode plate holder, and the electrode plate cover together form the electrode protection structure to ensure the stability and safety of the electrodes. The switch signal contact is a key node to achieve signal transmission, and accurately transmits the operation signal in cooperation with the contact pin of the tactical light sight to achieve functional control on the tactical light sight. The fixing screws are configured to firmly assemble all the components together so as to ensure the structural stability of the entire electrode switch assembly. The electrode switch assembly as a whole plays a key role in power conduction and signal transmission, and is one of the core components for the normal operation of the tactical light sight.

The long fixing screws connect the electrode switch assembly together, penetrate through the electrode switch assembly and the sealing rubber gasket, and are connected and locked to the tail cap main body to ensure the structural stability of the electrode switch assembly and the reliability of the electrical connection, and the sealing rubber gasket sandwiched between the electrode switch assembly and the tail cap main body has a good sealing effect.

The hanging hook is mounted in a center of a top of the tail cap switch assembly.

A hanging hook mounting hole is reserved in a center of a top of the tail cap main body, and the hanging hook is mounted in a center of a top of a tail cap switch by using short fixing screws to pass through hanging hook screw fixing holes. The hanging hook is configured to engage with the locking clasp assembly. This position ensures the uniformity of force applied during snapping, and the material endows the hanging hook with characteristics such as impact resistance, wear resistance, and corrosion protection, enabling it to adapt to various severe usage environments.

The locking clasp assembly includes a sliding clasp, a spring, and a pin rod. The spring is placed in a spring groove of the sliding clasp, then the spring and the sliding clasp are placed in a square groove formed in a tactical light sight main body, and the pin rod is inserted to fixedly connect the sliding clasp and the spring in the square groove of a light to ensure that the sliding clasp is transversely movable in a structure of the square groove. This design ensures that the tail cap switch does not fall off in an opened state. It not only fully takes into account the stability during use to prevent a tail cap from being accidentally lost when opened, but also considers the convenience of operation. A user can easily rotate the tail cap switch to perform operations such as battery replacement.

In a preferred solution of the quick-release tail cap switch structure, an elastic force of the spring provides automatic restoration power for the sliding clasp to ensure that the sliding clasp can quickly return to an initial position after being operated.

In a preferred solution of the quick-release tail cap switch structure, the hanging hook is made of a high-strength metal material and features an L-shaped structure. This position ensures the uniformity of force applied during snapping, and the material endows the hanging hook with characteristics such as impact resistance, wear resistance, and corrosion protection, enabling it to adapt to various severe usage environments.

In a preferred solution of the quick-release tail cap switch structure, the sliding clasp is connected to the hanging hook by a sliding structure; the sliding clasp is provided with an inclined groove, an L-shaped structure of the hanging hook can smoothly slide into the inclined groove of the sliding clasp in the locking clasp assembly, and when subjected to external force impact or pulling, the hanging hook has stable connection with the locking clasp assembly and does not accidentally fall off.

In a preferred solution of the quick-release tail cap switch structure, when the battery is replaced, the sliding clasp is pushed to unlock the hanging hook, and the tail cap switch can be ejected under a reaction force of the electrode springs.

In a preferred solution of the quick-release tail cap switch structure, the electrode switch assembly in the tail cap switch assembly is connected to a power supply, and the switch signal contact is connected to the signal contact pin on the light sight main body to form a complete signal transmission path.

In a preferred solution of the quick-release tail cap switch structure, the sealing rubber gasket on the tail cap switch assembly gradually fits tightly with the light sight main body as the tail cap main body rotates and is configured to fill a gap between the tail cap main body and the light sight main body to form an effective sealing barrier so as to achieve a waterproof effect.

The operation mode and principle of a quick-release function of a quick-release tail cap switch structure are as follows:

A tail cap is opened, namely, when the tail cap needs to be opened, a user pushes a sliding clasp disposed on a light sight body. In this case, the sliding clasp moves transversely on a pin rod by overcoming resistance of a spring and limitation of a snapping structure of the sliding clasp and a hanging hook to disengage from an L-shaped structure of the hanging hook. Since the hanging hook is connected to a tail cap switch assembly, the disengagement of the hanging hook from the sliding clasp means that a tail cap switch is in an unlocked state. Moreover, as a bottom of the tail cap switch assembly is connected to a tactical light sight by a rotatable connecting shaft, the user can rotate the tail cap switch assembly to open the tail cap, thus facilitating mounting of a battery. The principle lies in pushing the sliding clasp to change its position relative to the hanging hook with an external force by using a sliding connection structure between the sliding clasp and the hanging hook to achieve unlocking. Meanwhile, the rotatable design of the connecting shaft ensures the feasibility of opening the tail cap switch.

The tail cap is closed, namely, when the tail cap is snapped, the user only needs to press a tail cap main body of the switch. In this case, the hanging hook mounted in a center of a top of the tail cap switch fits with the sliding clasp as the tail cap main body rotates. Under the action of a pressing force, the sliding clasp moves transversely on the pin rod by overcoming the resistance of the spring, so that the L-shaped structure of the hanging hook can smoothly enter an inclined plane structure of the sliding clasp to complete a snapping action. This process makes use of the cooperation between the L-shaped structure of the hanging hook and an inclined groove of the sliding clasp as well as an elastic restoring force provided by the spring to ensure that the hanging hook and the sliding clasp are tightly snapped during normal use so as to ensure the fixing stability of the tail cap switch.

The operation mode and principle for side buttons to control turn-on and turn-off of a tactical light sight are as follows:

The tactical light sight is turned on, namely, when a tail cap switch is snapped, an electrode switch assembly in a tail cap switch assembly is connected to a power supply, and a switch signal contact is connected to a signal contact pin on a light sight main body to form a complete signal transmission path. In this case, a user presses the side buttons on the tail cap switch, and the side buttons rotate about button pin rods as shafts. Since compression springs are disposed inside the side buttons, the compression springs are compressed to store elastic potential energy during pressing. Meanwhile, protrusions on the side buttons precisely drive switch guide posts to press surface-mounted switches in the electrode switch assembly. After the surface-mounted switches are pressed, a state of a circuit in the electrode switch assembly is changed, so that a current can be conducted to the tactical light sight through a component such as an electrode PCB, thus turning on the tactical light sight. This process utilizes the linkage of mechanical structures and the principle of circuit conduction to transform a button operation of the user into an action of turning on the tactical light sight.

The tactical light sight is turned off, namely, when the user releases the side buttons, the previously compressed compression springs release the elastic potential energy and provide an elastic force for the side buttons to quickly restore them. After the side buttons are restored, the switch guide posts are no longer under the action of the protrusions on the side buttons, the surface-mounted switches restore to an initial state, the circuit in the electrode switch assembly is disconnected, and the tactical light sight is then turned off. This process demonstrates the principle of using elastic restoration of the compression springs to achieve automatic restoration of the side buttons so as to control the tactical light sight to be turned off.

The operation mode and principle of waterproof sealing are as follows: During snapping of a tail cap switch, a sealing rubber gasket on a tail cap switch assembly gradually fits tightly with a light sight main body as a tail cap main body rotates. The sealing rubber gasket itself has certain elasticity and flexibility. When the sealing rubber gasket fits with the light sight main body, the sealing rubber gasket can fill a tiny gap that may exist between the tail cap main body and the light sight main body to form an effective sealing barrier. When external water attempts to seep into the tail cap switch structure, the sealing function of the sealing rubber gasket can prevent the water from entering the interior through the gap, thus protecting a circuit in a tactical light sight from being damaged by the water. The waterproof principle is based on the material properties of the sealing rubber gasket and the structural design of tight fit, which effectively prevents water seepage and ensures the normal use of the tactical light sight in a humid environment.

The operation mode and principle of circuit connection and signal transmission are as follows:

A circuit is connected, namely, one end of each electrode spring in an electrode switch assembly is connected to an electrode PCB, and the other end thereof matches with a component such as an electrode cap. When a battery is mounted in a tail cap switch assembly, the electrode springs provide an elastic contact force to ensure good electrical connection between electrodes and the battery, so that the battery can provide electrical energy for the entire circuit. Meanwhile, an electrode plate holder and an electrode plate cover together form an electrode protection structure to ensure the stability and safety of the electrodes and maintain the reliability of circuit connection.

The present utility model has the following beneficial effects:

Quick dismounting and mounting are achieved, namely quick dismounting and mounting of a tail cap switch are achieved through the ingenious cooperation between a hanging hook and a locking clasp assembly as well as the design of a sliding clasp. Without the need for additional tools, a user can complete a battery replacement operation within a short time, which greatly improves the usage efficiency of a tactical light and meets the requirement for rapid equipment maintenance in an emergency situation.

Firm fixation is achieved, namely, an L-shaped structure of the hanging hook fits tightly with an inclined groove of the locking clasp assembly, and under the action of a spring, the hanging hook and the locking clasp assembly are firmly engaged with each other. Such a design enables the tail cap switch to withstand relatively large vibration and impact. In various complex usage environments, it can ensure that the tail cap switch does not become loose or fall off during use, thus ensuring the stability and reliability of a tactical light sight.

Good waterproof performance is achieved, namely, a sealing rubber gasket on the tail cap switch fits tightly with a light sight main body when a tail cap is snapped, to form a reliable sealing barrier. This design effectively prevents water seepage, greatly improves the usage reliability of the tactical light in harsh environments such as a humid environment and a wading environment, prolongs the service life of the light, and reduces the risk of equipment damage due to water ingress.

In the drawings: 1—tactical light sight, 2—tail cap switch assembly, 3—connecting shaft, 4—locking clasp assembly, 5—hanging hook, 6—sliding clasp, 7—spring, 8—pin rod, 9—square groove, 10—long fixing screw, 11—electrode plate cover, 12—switch signal contact, 13—electrode plate holder, 14—electrode cap, 15—electrode spring, 16—electrode PCB, 17—switch fixing plate, 18—sealing rubber gasket, 19—switch guide post, 20—side button, 21—compression spring, 22—button pin rod, 23—short fixing screw, 24—tail cap main body, 25—surface-mounted switch, 26—hanging hook screw fixing hole, 27—spring groove, 28—inclined groove, 29—L-shaped structure, 30—protrusion a, and 31—protrusion b.

DETAILED DESCRIPTION OF THE EMBODIMENTS

To make the objectives, technical solutions, and advantages of the present utility model clearer, the present utility model is further described in detail below in combination with specific embodiments.

Referring to FIGS. 1 to 10, a quick-release tail cap switch structure includes a tail cap switch assembly 2, a hanging hook 5, a locking clasp assembly 4, and a connecting shaft 3.

Figure 4:
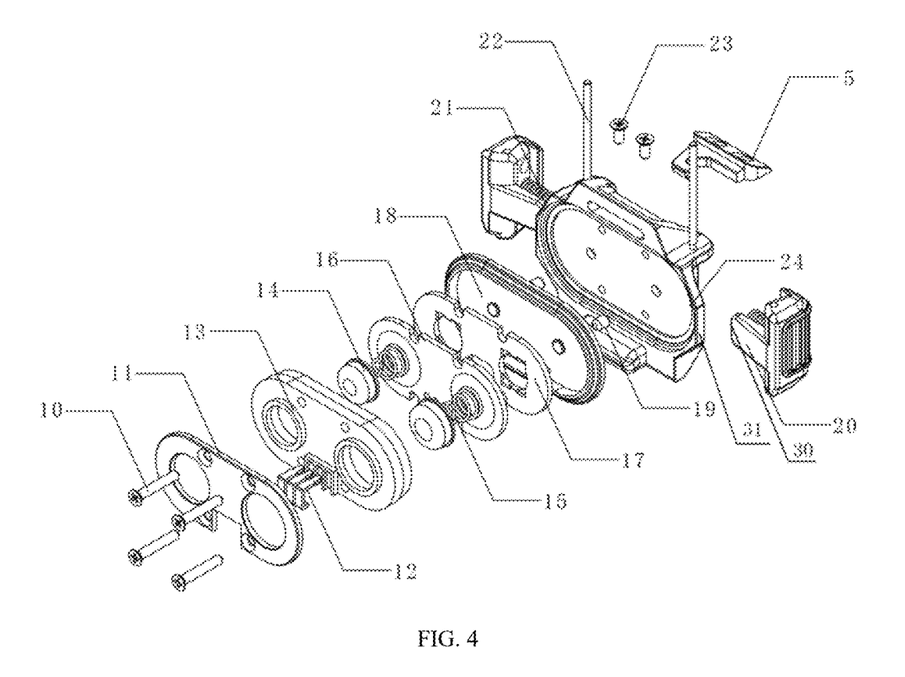
FIG. 4 is a schematic structural diagram of a tail cap switch assembly.

The tail cap switch assembly 2 includes a tail cap main body 24, side buttons 20, switch guide posts 19, compression springs 21, button pin rods 22, a sealing rubber gasket 18, and an electrode switch assembly.

Figure 5:
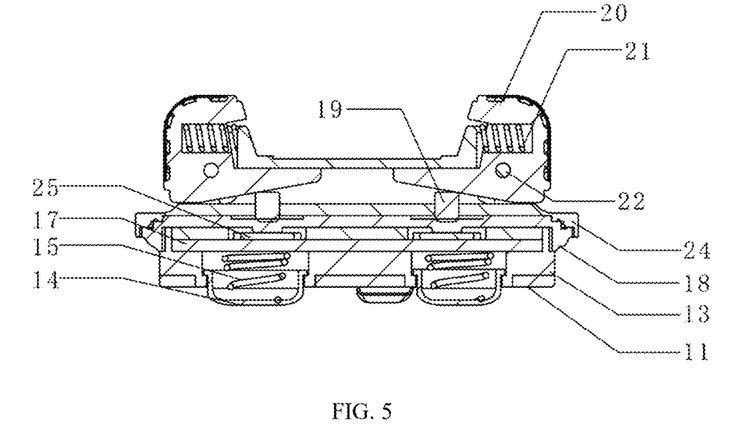
FIG. 5 is a cross-sectional view of buttons of a tail cap switch assembly in an off state.
Figure 6:
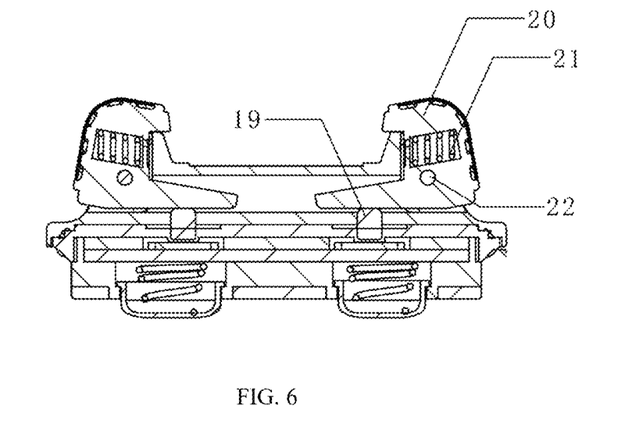
FIG. 6 is a cross-sectional view of buttons of a tail cap switch assembly in an on state.

The side buttons 20 are fixed to two sides of the tail cap main body 24 by the button pin rods 22, the side buttons 20 are rotatable about the button pin rods 22 as shafts, the side buttons 20 are provided with protrusions a 30, and the protrusions a 30 are configured to drive the switch guide posts 19 to touch surface-mounted switches 25 on electrode switches.

The compression springs 21 are disposed inside the side buttons 20 and are configured to provide an elastic force to restore the side buttons after the side buttons 20 are pressed.

Protrusions b are disposed on two sides of the tail cap main body 24 and are configured to prevent the side buttons 20 from being accidentally touched.

The electrode switch assembly includes an electrode PCB 16, electrode springs 15, electrode caps 14, an electrode plate holder 13, an electrode plate cover 11, a switch signal contact 12, long fixing screws 10, and a switch fixing plate 17. The electrode caps 14, the electrode plate holder 13, and the electrode plate cover 11 together form an electrode protection structure. The switch fixing plate 17 and the electrode PCB 16 are disposed in the electrode protection structure. The electrode springs 15 are disposed between the electrode PCB 16 and the electrode caps 14, and provide an elastic contact force to ensure good electrical connection between electrodes and a battery. The electrode PCB 16 is configured to implement circuit conduction and signal processing. The switch signal contact 12 is disposed on the electrode plate holder 13 and is configured to transmit an operation signal in cooperation with a contact pin of a tactical light sight.

The long fixing screws 10 connect the electrode switch assembly together, penetrate through the electrode switch assembly and the sealing rubber gasket 18, and are connected and locked to the tail cap main body 24 to ensure the structural stability of the electrode switch assembly and the reliability of the electrical connection, and the sealing rubber gasket 18 sandwiched between the electrode switch assembly and the tail cap main body 24 has a good sealing effect.

The hanging hook 5 is mounted in a center of a top of the tail cap switch assembly 2.

Figure 7:
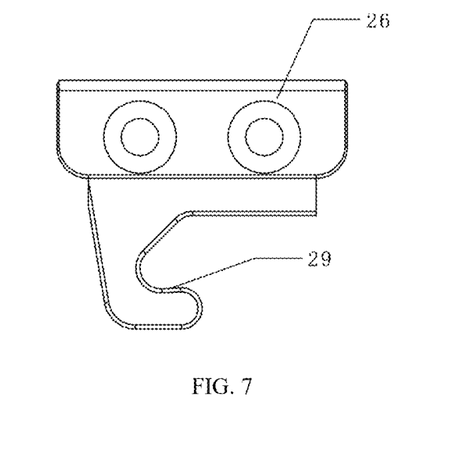
FIG. 7 is a schematic structural diagram of a hanging hook.
Figure 8:
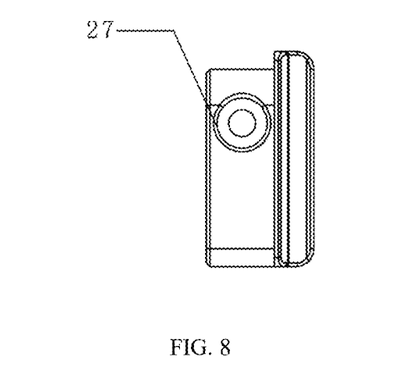
FIG. 8 is a side view of a hanging hook in a tail cap switch structure.

A hanging hook mounting hole is reserved in a center of a top of the tail cap main body 24, and the hanging hook 5 is mounted in a center of a top of a tail cap switch by using short fixing screws 23 to pass through hanging hook screw fixing holes 26. The hanging hook 5 is configured to engage with the locking clasp assembly 4.

Figure 3:
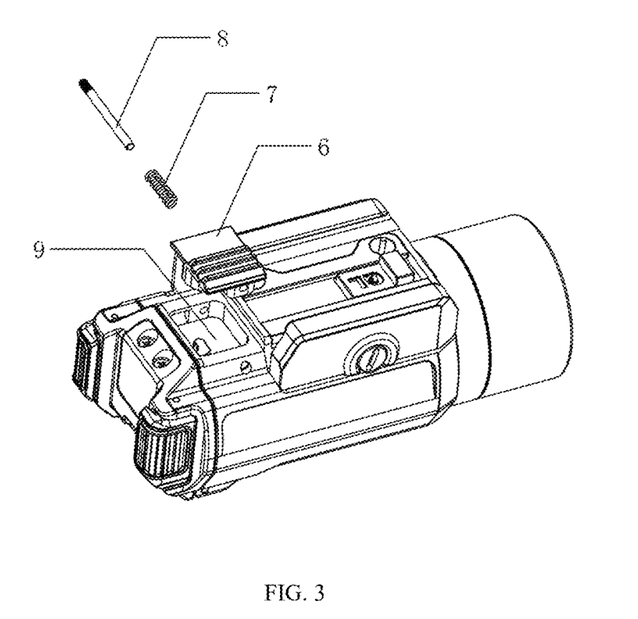
FIG. 3 is a schematic structural diagram of a locking clasp assembly.
Figure 9:
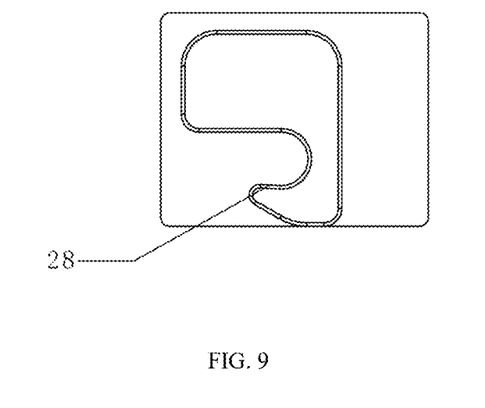
FIG. 9 is a schematic structural diagram of a sliding clasp.
Figure 10:
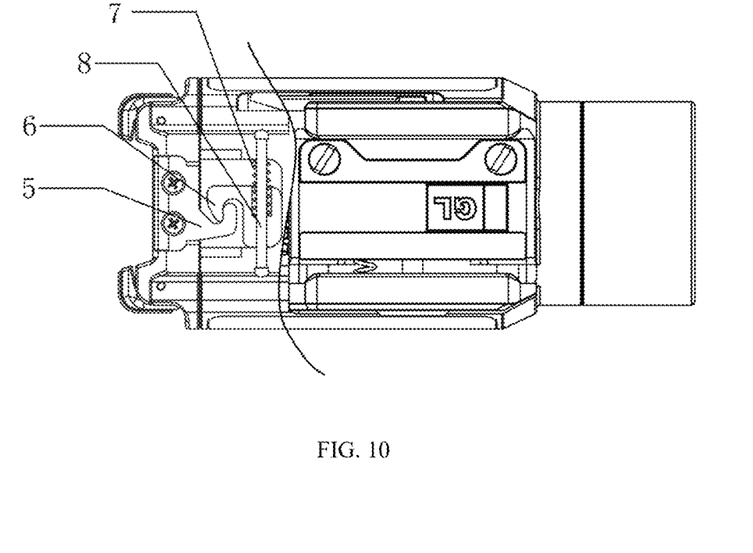
FIG. 10 is a cross-sectional view of a locking clasp assembly.

The locking clasp assembly includes a sliding clasp 6, a spring 7, and a pin rod 8; and the spring 7 is placed in a spring groove 27 of the sliding clasp 6, then the spring and the sliding clasp are placed in a square groove 9 formed in a tactical light sight main body 1, and the pin rod 8 is inserted to fixedly connect the sliding clasp 6 and the spring 7 in the square groove 9 of a light to ensure that the sliding clasp 6 is transversely movable in a structure of the square groove 9.

An elastic force of the spring 7 provides automatic restoration power for the sliding clasp to ensure that the sliding clasp 6 can quickly return to an initial position after being operated.

The hanging hook 5 is made of a high-strength metal material and features an L-shaped structure 29.

The sliding clasp 6 is connected to the hanging hook by a sliding structure. The sliding clasp 6 is provided with an inclined groove 28, the L-shaped structure 29 of the hanging hook 5 can smoothly slide into the inclined groove 28 of the sliding clasp 6 in the locking clasp assembly 4, and when subjected to external force impact or pulling, the hanging hook 5 has stable connection with the locking clasp assembly and does not accidentally fall off.

When the battery is replaced, the sliding clasp is pushed to unlock the hanging hook, and the tail cap switch can be ejected under a reaction force of the electrode springs.

The electrode switch assembly in the tail cap switch assembly 2 is connected to a power supply, and the switch signal contact 12 is connected to the signal contact pin on the light sight main body to form a complete signal transmission path.

The sealing rubber gasket 18 on the tail cap switch assembly 2 gradually fits tightly with the light sight main body as the tail cap main body 24 rotates and is configured to fill a gap between the tail cap main body 24 and the light sight main body 1 to form an effective sealing barrier so as to achieve a waterproof effect.

Figure 1:
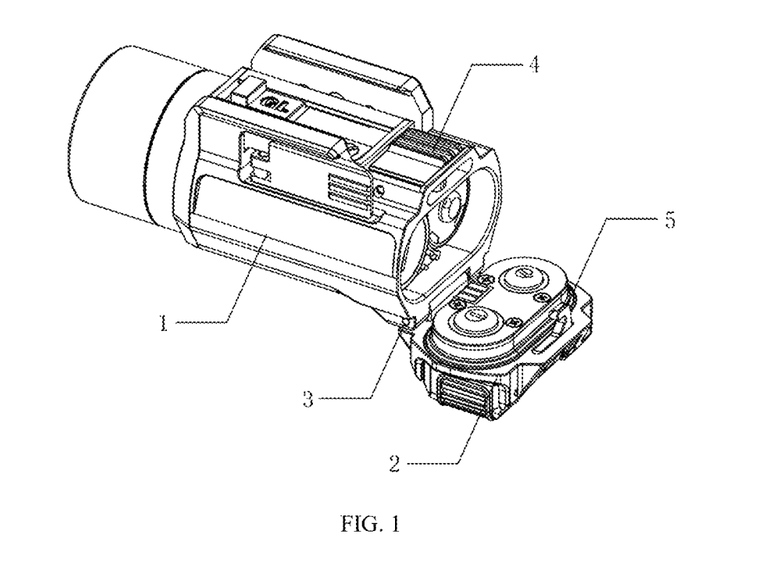
FIG. 1 is a schematic diagram of a quick-release tail cap switch structure in an opened state.

The operation mode and principle of a quick-release function are as follows:

A tail cap is opened, namely, when the tail cap needs to be opened, a user pushes a sliding clasp 6 disposed on a light sight body. In this case, the sliding clasp 6 moves transversely on a pin rod 8 by overcoming resistance of a spring 7 and limitation of a snapping structure of the sliding clasp and a hanging hook 5 to disengage from an L-shaped structure 29 of the hanging hook. Since the hanging hook 5 is connected to a tail cap switch assembly 2, the disengagement of the hanging hook 5 from the sliding clasp 6 means that a tail cap switch is in an unlocked state. Moreover, as a bottom of the tail cap switch assembly 2 is connected to a tactical light sight 1 by a rotatable connecting shaft 3, the user can rotate the tail cap switch assembly 2 to open the tail cap, thus facilitating mounting of a battery. The principle lies in pushing the sliding clasp 6 to change its position relative to the hanging hook 5 with an external force by using a sliding connection structure between the sliding clasp 6 and the hanging hook 5 to achieve unlocking. Meanwhile, the rotatable design of the connecting shaft 3 ensures the feasibility of opening the tail cap switch.

Figure 2:
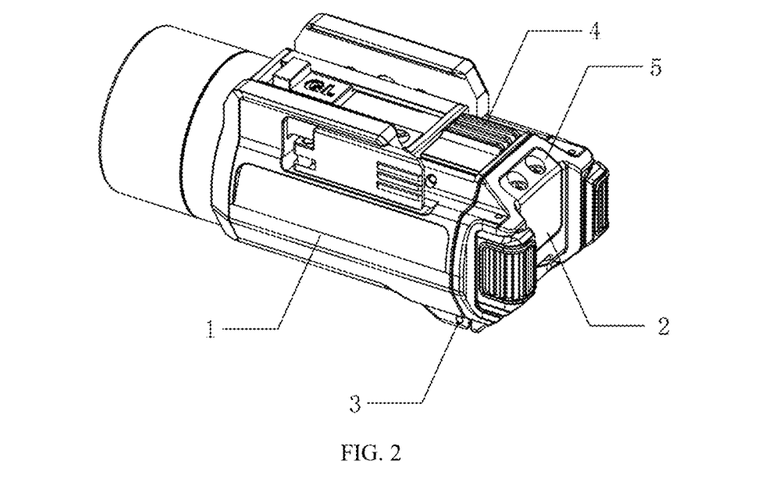
FIG. 2 is a schematic diagram of a quick-release tail cap switch structure in a closed state.

The tail cap is closed, namely, when the tail cap is snapped, the user only needs to press a tail cap main body 24 of the switch. In this case, the hanging hook 5 mounted in a center of a top of the tail cap switch fits with the sliding clasp 6 as the tail cap main body rotates. Under the action of a pressing force, the sliding clasp 6 moves transversely on the pin rod 8 by overcoming the resistance of the spring 7, so that the L-shaped structure 29 of the hanging hook can smoothly enter an inclined plane structure 28 of the sliding clasp to complete a snapping action. This process makes use of the cooperation between the L-shaped structure 29 of the hanging hook and the inclined plane structure 28 of the sliding clasp as well as an elastic restoring force provided by the spring to ensure that the hanging hook and the sliding clasp are tightly snapped during normal use so as to ensure the fixing stability of the tail cap switch.

The operation mode and principle for side buttons to control turn-on and turn-off of a tactical light sight are as follows:

The tactical light sight is turned on, namely, when a tail cap switch is snapped, an electrode switch assembly in a tail cap switch assembly 2 is connected to a power supply, and a switch signal contact 12 is connected to a signal contact pin on a light sight main body to form a complete signal transmission path. In this case, a user presses the side buttons 20 on the tail cap switch, and the side buttons 20 rotate about button pin rods 22 as shafts. Since compression springs 21 are disposed inside the side buttons 20, the compression springs are compressed to store elastic potential energy during pressing. Meanwhile, protrusions on the side buttons 20 precisely drive switch guide posts 19 to press surface-mounted switches 25 in the electrode switch assembly. After the surface-mounted switches 25 are pressed, a state of a circuit in the electrode switch assembly is changed, so that a current can be conducted to the tactical light sight through a component such as an electrode PCB 16, thus turning on the tactical light sight. This process utilizes the linkage of mechanical structures and the principle of circuit conduction to transform a button operation of the user into an action of turning on the tactical light sight.

The tactical light sight is turned off, namely, when the user releases the side buttons 20, the previously compressed compression springs 21 release the elastic potential energy and provide an elastic force for the side buttons 20 to quickly restore them. After the side buttons 20 are restored, the switch guide posts 19 are no longer under the action of the protrusions on the side buttons, the surface-mounted switches 25 restore to an initial state, the circuit in the electrode switch assembly is disconnected, and the tactical light sight is then turned off. This process demonstrates the principle of using elastic restoration of the compression springs 21 to achieve automatic restoration of the side buttons so as to control the tactical light sight to be turned off.

The operation mode and principle of waterproof sealing are as follows: During snapping of a tail cap switch, a sealing rubber gasket 18 on a tail cap switch assembly 2 gradually fits tightly with a light sight main body as a tail cap main body 24 rotates. The sealing rubber gasket 18 itself has certain elasticity and flexibility. When the sealing rubber gasket fits with the light sight main body, the sealing rubber gasket 18 can fill a tiny gap that may exist between the tail cap main body 24 and the light sight main body 1 to form an effective sealing barrier. When external water attempts to seep into the tail cap switch structure, the sealing function of the sealing rubber gasket 18 can prevent the water from entering the interior through the gap, thus protecting a circuit in a tactical light sight from being damaged by the water. The waterproof principle is based on the material properties of the sealing rubber gasket 18 and the structural design of tight fit, which effectively prevents water seepage and ensures the normal use of the tactical light sight in a humid environment.

The operation mode and principle of circuit connection and signal transmission are as follows:

A circuit is connected, namely, one end of each electrode spring 15 in an electrode switch assembly is connected to an electrode PCB 16, and the other end thereof matches with a component such as an electrode cap 14. When a battery is mounted in a tail cap switch assembly, the electrode springs 15 provide an elastic contact force to ensure good electrical connection between electrodes and the battery, so that the battery can provide electrical energy for the entire circuit. Meanwhile, an electrode plate holder 13 and an electrode plate cover 11 together form an electrode protection structure to ensure the stability and safety of the electrodes and maintain the reliability of circuit connection.

The above content is a further detailed description of the present utility model in combination with specific preferred embodiments, and it cannot be determined that the specific implementation of the present utility model is limited only to these descriptions. Several simple deductions or substitutions can still be made by those of ordinary skill in the technical field to which the present utility model belongs without departing from the concept of the present utility model, and should all be regarded as falling within the scope of protection of the present utility model.

What is claimed is:

1. A quick-release tail cap switch structure, comprising a tail cap switch assembly (2), a hanging hook (5), a locking clasp assembly (4), and a connecting shaft (3), wherein the tail cap switch assembly (2) comprises a tail cap main body (24), side buttons (20), switch guide posts (19), compression springs (21), button pin rods (22), a sealing rubber gasket (18), and an electrode switch assembly;

the side buttons (20) are fixed to two sides of the tail cap main body (24) by the button pin rods (22), the side buttons (20) are rotatable about the button pin rods (22) as shafts, the side buttons (20) are provided with first protrusions (30), and the first protrusions (30) are configured to drive the switch guide posts (19) to touch surface-mounted switches (25) on electrode switches;

the compression springs (21) are disposed inside the side buttons (20) and are configured to provide an elastic force to restore the side buttons after the side buttons (20) are pressed;

second protrusions (31) are disposed on two sides of the tail cap main body (24) and are configured to prevent the side buttons (20) from being accidentally touched;

the electrode switch assembly comprises an electrode PCB (16), electrode springs (15), electrode caps (14), an electrode plate holder (13), an electrode plate cover (11), a switch signal contact (12), long fixing screws (10), and a switch fixing plate (17); the electrode caps (14), the electrode plate holder (13), and the electrode plate cover (11) together form an electrode protection structure; the switch fixing plate (17) and the electrode PCB (16) are disposed in the electrode protection structure, and the electrode springs (15) are disposed between the electrode PCB (16) and the electrode caps (14), and provide an elastic contact force to ensure electrical connection between electrodes and a battery; the electrode PCB (16) is configured to implement circuit conduction and signal processing; the switch signal contact (12) is disposed on the electrode plate holder (13) and is configured to transmit an operation signal in cooperation with a contact pin of a tactical light sight;

the long fixing screws (10) connect the electrode switch assembly together, penetrate through the electrode switch assembly and the sealing rubber gasket (18), and are connected and locked to the tail cap main body (24) to ensure the structural stability of the electrode switch assembly and the reliability of the electrical connection, and the sealing rubber gasket (18) sandwiched between the electrode switch assembly and the tail cap main body (24) has a sealing effect;

the hanging hook (5) is mounted in a center of a top of the tail cap switch assembly (2), a hanging hook mounting hole is reserved in a center of a top of the tail cap main body (24), and the hanging hook (5) is mounted in a center of a top of a tail cap switch by using short fixing screws (23) to pass through hanging hook screw fixing holes (26); the hanging hook (5) is configured to engage with the locking clasp assembly (4); and the locking clasp assembly comprises a sliding clasp (6), a spring (7), and a pin rod (8); and the spring (7) is placed in a spring groove (27) of the sliding clasp (6), then the spring and the sliding clasp are placed in a square groove (9) formed in a tactical light sight main body (1), and the pin rod (8) is inserted to fixedly connect the sliding clasp (6) and the spring (7) in the square groove (9) of a light to ensure that the sliding clasp (6) is transversely movable in a structure of the square groove (9).

2. The quick-release tail cap switch structure according to claim 1, wherein an elastic force of the spring (7) provides automatic restoration power for the sliding clasp to ensure that the sliding clasp (6) is capable of returning to an initial position after being operated.

3. The quick-release tail cap switch structure according to claim 1, wherein the hanging hook (5) is made of a metal material and features an L-shaped structure (29).

4. The quick-release tail cap switch structure according to claim 1, wherein the sliding clasp (6) is connected to the hanging hook by a sliding structure; the sliding clasp (6) is provided with an inclined groove (28), an L-shaped structure (29) of the hanging hook (5) is capable of sliding into the inclined groove (28) of the sliding clasp (6) in the locking clasp assembly (4), and when subjected to external force impact or pulling, the hanging hook (5) has stable connection with the locking clasp assembly and does not accidentally fall off.

5. The quick-release tail cap switch structure according to claim 1, wherein when the battery is replaced, the sliding clasp is pushed to unlock the hanging hook, and the tail cap switch is capable of being ejected under a reaction force of the electrode springs.

6. The quick-release tail cap switch structure according to claim 1, wherein the electrode switch assembly in the tail cap switch assembly (2) is connected to a power supply, and the switch signal contact (12) is connected to the signal contact pin on the light sight main body to form a complete signal transmission path.

7. The quick-release tail cap switch structure according to claim 1, wherein the sealing rubber gasket (18) on the tail cap switch assembly (2) fits with the light sight main body as the tail cap main body (24) rotates and is configured to fill a gap between the tail cap main body (24) and the light sight main body (1) to form an effective sealing barrier so as to achieve a waterproof effect.

* * * * *